United States Patent
Bachmann et al.

(10) Patent No.: US 10,972,949 B2
(45) Date of Patent: *Apr. 6, 2021

(54) SLEEP-STATE FOR MOBILE TERMINAL AND SERVICE INITIATION FOR MOBILE TERMINALS IN SLEEP-STATE

(71) Applicant: Panasonic Intellectual Property Corporation of America, Torrance, CA (US)

(72) Inventors: Jens Bachmann, Langen (DE); Kilian Weniger, Langen (DE); Rolf Hakenberg, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,707

(22) Filed: Aug. 20, 2020

(65) Prior Publication Data

US 2020/0383013 A1 Dec. 3, 2020

Related U.S. Application Data

(63) Continuation of application No. 16/848,505, filed on Apr. 14, 2020, now Pat. No. 10,785,689, which is a
(Continued)

(30) Foreign Application Priority Data

Mar. 27, 2006 (EP) .................................. 06006300

(51) Int. Cl.
*H04W 36/00* (2009.01)
*H04W 68/00* (2009.01)
(Continued)

(52) U.S. Cl.
CPC ....... *H04W 36/0055* (2013.01); *H04W 36/14* (2013.01); *H04W 52/0235* (2013.01);
(Continued)

(58) Field of Classification Search
CPC .. Y02D 70/142; Y02D 70/168; Y02D 70/146; Y02D 70/164; Y02D 70/1242;
(Continued)

(56) References Cited

U.S. PATENT DOCUMENTS

| 5,237,321 A | 8/1993 | Oliwa |
| 6,230,009 B1 | 5/2001 | Holmes et al. |

(Continued)

FOREIGN PATENT DOCUMENTS

| EP | 0 798 880 A2 | 10/1997 |
| EP | 0 800 283 A2 | 10/1997 |

(Continued)

OTHER PUBLICATIONS

3GPP TR 23.882 V1.0.0, "3$^{rd}$ Generation Partnership Project; Technical Specification Group Services and System Aspects; 3GPP System Architecture Evolution: Report on Technical Opinions and Conclusions (Release 7)," Mar. 2006, 114 pages.

(Continued)

*Primary Examiner* — William Nealon
(74) *Attorney, Agent, or Firm* — Seed IP Law Group LLP

(57) ABSTRACT

The invention relates to the initiation of a service to a mobile terminal capable of communicating via at least a first and second access network. Further, the invention relates to a reduction of power consumption of mobile terminals supporting connectivity to at least two access networks. The invention also relates to mobile communication systems and in particular to mobile communications through heterogeneous access networks. In order to prove improved method for initiating services to mobile terminals and/or to reduce (Continued)

power consumption of mobile terminals, the invention introduces of a sleep state that can be entered by the terminal for an access system if same is not used. Upon requesting a service from/to the mobile terminal, the mobile terminal starts service initiation through a second access system and transits back to active state for the first access system for service provision.

10 Claims, 11 Drawing Sheets

Related U.S. Application Data continuation of application No. 16/564,956, filed on Sep. 9, 2019, now Pat. No. 10,660,000, which is a continuation of application No. 16/352,560, filed on Mar. 13, 2019, now Pat. No. 10,455,461, which is a continuation of application No. 16/142,849, filed on Sep. 26, 2018, now Pat. No. 10,278,097, which is a continuation of application No. 15/956,680, filed on Apr. 18, 2018, now Pat. No. 10,117,138, which is a continuation of application No. 15/839,717, filed on Dec. 12, 2017, now Pat. No. 9,980,184, which is a continuation of application No. 15/351,191, filed on Nov. 14, 2016, now Pat. No. 9,883,425, which is a continuation of application No. 13/543,615, filed on Jul. 6, 2012, now Pat. No. 9,526,070, which is a continuation of application No. 12/282,111, filed as application No. PCT/EP2007/002028 on Mar. 8, 2007, now Pat. No. 8,249,037.

(51) Int. Cl.
*H04W 8/26* (2009.01)
*H04W 88/06* (2009.01)
*H04W 76/27* (2018.01)
*H04W 36/14* (2009.01)
*H04W 52/02* (2009.01)
*H04W 48/18* (2009.01)
*H04W 76/10* (2018.01)

(52) U.S. Cl.
CPC ......... *H04W 68/005* (2013.01); *H04W 76/27* (2018.02); *H04W 8/26* (2013.01); *H04W 48/18* (2013.01); *H04W 68/00* (2013.01); *H04W 76/10* (2018.02); *H04W 88/06* (2013.01); *Y02B 70/30* (2013.01); *Y02D 30/70* (2020.08)

(58) Field of Classification Search
CPC .. Y02B 70/30; H04W 36/0055; H04W 36/14; H04W 76/27; H04W 76/10; H04W 52/0235; H04W 8/26; H04W 48/18; H04W 88/06; H04W 70/30
USPC ......................................................... 455/436
See application file for complete search history.

(56) References Cited

U.S. PATENT DOCUMENTS

| | | | |
|---|---|---|---|
| 6,385,453 B1 | 5/2002 | Foladare et al. | |
| 6,459,362 B1 | 10/2002 | Jonsson | |
| 6,549,779 B1 | 4/2003 | Müller et al. | |
| 6,560,457 B1 | 5/2003 | Silver et al. | |
| 6,898,427 B1 | 5/2005 | Griffith et al. | |
| 7,047,036 B2 | 5/2006 | Shaheen et al. | |
| 7,089,023 B2 | 8/2006 | Vialen et al. | |
| 7,209,465 B2 | 4/2007 | Matsugatani et al. | |
| 7,366,524 B2 | 4/2008 | Watanabe et al. | |
| 7,395,085 B1 | 7/2008 | Mauer et al. | |
| 7,403,621 B2 | 7/2008 | Vialen et al. | |
| 7,957,352 B2 | 6/2011 | Vanghi et al. | |
| 8,121,293 B2 | 2/2012 | Vialen et al. | |
| 2002/0019241 A1 | 2/2002 | Vialen et al. | |
| 2002/0066011 A1 | 5/2002 | Vialen et al. | |
| 2002/0090975 A1 | 7/2002 | Laiho et al. | |
| 2002/0111154 A1 | 8/2002 | Eldering et al. | |
| 2002/0111169 A1 | 8/2002 | Vanghi | |
| 2002/0173303 A1 | 11/2002 | Shibutani | |
| 2003/0148777 A1 | 8/2003 | Watanabe et al. | |
| 2003/0153324 A1 | 8/2003 | Veerepalli et al. | |
| 2004/0002330 A1 | 1/2004 | Chitrapu | |
| 2004/0165574 A1 | 8/2004 | Kakumaru et al. | |
| 2004/0248574 A1 | 12/2004 | Watanabe et al. | |
| 2004/0248616 A1 | 12/2004 | Pecen et al. | |
| 2005/0036468 A1 | 2/2005 | Miyabayashi et al. | |
| 2005/0043020 A1 | 2/2005 | Lipsanen et al. | |
| 2005/0054348 A1 | 3/2005 | Turina et al. | |
| 2005/0117546 A1 | 6/2005 | Lioy et al. | |
| 2005/0227691 A1 | 10/2005 | Pecen et al. | |
| 2006/0003807 A1 | 1/2006 | Inoue et al. | |
| 2006/0009242 A1 | 1/2006 | Ryu et al. | |
| 2006/0035682 A1 | 2/2006 | Karaoguz et al. | |
| 2006/0039332 A1 | 2/2006 | Kotzin | |
| 2006/0104262 A1 | 5/2006 | Kant et al. | |
| 2006/0126582 A1 | 6/2006 | Saifullah et al. | |
| 2006/0189331 A1 | 8/2006 | Lundsjo et al. | |
| 2007/0121560 A1 | 5/2007 | Edge | |
| 2008/0267405 A1 | 10/2008 | Vialen et al. | |
| 2009/0163223 A1* | 6/2009 | Casey | H04W 36/22 455/453 |
| 2009/0186627 A1* | 7/2009 | Zhang | H04W 72/0486 455/453 |
| 2010/0088410 A1* | 4/2010 | Ridley | H04L 41/0896 709/224 |
| 2010/0232390 A1* | 9/2010 | Varma | H04W 72/0486 370/331 |
| 2011/0176424 A1* | 7/2011 | Yang | H04L 41/0803 370/236.2 |

FOREIGN PATENT DOCUMENTS

| | | |
|---|---|---|
| EP | 1 339 250 A2 | 8/2003 |
| EP | 1 492 277 A2 | 12/2004 |
| EP | 1 569 487 A1 | 8/2005 |
| JP | 2004515177 A | 5/2004 |
| JP | 2006074603 A | 3/2006 |
| WO | 98/50909 A1 | 11/1998 |
| WO | 2004/006445 A2 | 1/2004 |
| WO | 2004/008693 A1 | 1/2004 |
| WO | 2004056142 A1 | 7/2004 |
| WO | 2005/036912 A2 | 4/2005 |
| WO | 2005048490 A1 | 5/2005 |
| WO | 2005/057968 A1 | 6/2005 |
| WO | 2005/084055 A1 | 9/2005 |

OTHER PUBLICATIONS

3GPP TS 23.203 V0.4.0, "3$^{rd}$ Generation Partnership Project; Technical Specification Group Services and System Aspects; Policy and charging control architecture; (Release 7)," Feb. 2006, 53 pages.
3GPP TS 23.228 V7.2.0, "3$^{rd}$ Generation Partnership Project; Technical Specification Group Services and System Aspects; IP Multimedia Subsystem (IMS); Stage 2 (Release 7)," Dec. 2005, 192 pages.
3GPP TS 23.246 V6.9.0, "3$^{rd}$ Generation Partnership Project; Technical Specification Group Services and System aspects; Multimedia Broadcast/Multicast Service (MBMS); Architecture and functional description (Release 6)," Dec. 2005, 47 pages.
Extended European Search Report dated Nov. 20, 2013, for corresponding EP Application No. 11193074.9-1857 / 2434812, 7 pages.
Extended European Search Report dated Nov. 27, 2013, for corresponding EP Application No. 12182625.9-1857 / 2530984, 8 pages.
Extended European Search Report, dated Sep. 24, 2018, for European Application No. 18176742.7-1215, 8 pages.
European Search Report for corresponding EP Application No. 06006300, date of completion of search Feb. 19, 2007, 6 pages.

(56) References Cited

OTHER PUBLICATIONS

European Communication pursuant to Article 94(3) EPC, dated Jul. 3, 2017, for corresponding European Application No. 11 193 074.9-1857, 8 pages.
International Search Report for PCT/EP2007/002028, dated Sep. 3, 2007, 2 pages.
Japanese Office Action dated Dec. 25, 2012, for corresponding JP Application No. 2011-248870, 4 pages. (W/ English Translation).
Johnson et al., "Mobility Support in IPv6," *Network Working Group; Standards Track*, The Internet Society, Jun. 2004, 165 pages.
Rosenberg et al. "SIP Session Initiation Protocol," *Network Working Group; Standards Track*, The Internet Society, Jun. 2002, 269 pages.

\* cited by examiner

SLEEP-STATE FOR MOBILE TERMINAL AND SERVICE INITIATION FOR MOBILE TERMINALS IN SLEEP-STATE

FIELD OF THE INVENTION

The invention relates to the initiation of a service to a mobile terminal capable of communicating via at least a first and second access network. Further, the invention relates to a reduction of power consumption of mobile terminals supporting connectivity to at least two access networks. The invention also relates to mobile communication systems and in particular to mobile communications through heterogeneous access networks.

TECHNICAL BACKGROUND

In 3GPP the evolution of the UMTS architecture is discussed in 3GPP TR 23.882, "3GPP System Architecture Evolution: Report on Technical Options and Conclusions", V. 1.0.0 (available at http://www.3gpp.org), incorporated herein by reference. The motivation for the evolution is—among others—the development of a new air interface and the support for mobility between heterogeneous access networks.

An exemplary logical high-level architecture for the evolved system is shown in FIG. 1 and comprises at first an Inter Access System Anchor (Inter AS Anchor), being a user plane anchor for mobility between different access systems and supporting handover between different access systems. Functions of the anchor are, e.g.

- Packet routing and forwarding,
- Authentication, authorization and key management,
- Policy and Charging Enforcement Function,
- Gateway to PDNs, including IP address allocation from PDN address space Furthermore the architecture comprises a Mobility Management Entity (MME) and User Plane Entity (UPE). The functions of the MME are, e.g.,

- Management and storage of UE control plane context,
- Mobility management,
- Authentication, authorization and key management,
- Ciphering/integrity termination for signaling,
- Management and allocation of temporary user identities, and the functions of the UPE are, e.g.,
- Management and storage of UE user plane context
- Packet routing and forwarding,
- Policy and Charging Enforcement Function,
- Ciphering termination for user plane traffic,
- Trigger/initiation of paging when downlink data arrive for the UE in idle state.

The MME, UPE and Inter AS Anchor are logical entities, i.e., the functionalities can be, e.g., deployed in different physical entities or combined in one single physical entity. Furthermore it is possible to have multiple MMEs, UPEs or anchors within one operator domain. Thus, with multiple MMEs/UPEs the data packet route from the anchor to the UE can be optimized, or the load can be shared between different MMEs/UPEs. In addition the network can provide connectivity to different PDNs (Packet Data Networks) over one or multiple Inter AS Anchors in the operator domain.

In the evolved system, the terminal (UE) must be registered (attached) with the network to receive services that require registration. During the first registration with the network, a Default IP Access Service is established, the UE is provided with an IP address and a default context (comprising e.g., UE/user identities, mobility state, tracking area, security parameters, QoS information, internal routing information and other parameters) is established in the network.

Further, the UE, in order to be able to send and receive user data, must be in an active state with the 3GPP interface. In this state a radio connection is established and the UE reports measurements and requirements to the base station. Then, bearers are established between the UE and the network, carrying first the signaling and later the user data.

During mobility in active state the UE continuously measures the signal strength of neighbouring cells and sends measurement reports to the network. When the network decides to use a new base station, it establishes a new radio link and triggers the UE to handover to the new base station.

In addition to the active state a mode with lower power consumption is supported. This mode is called idle state and is used when no user data is sent or received. In idle state the cell reselection is performed by the UE and only tracking area (TA) changes are registered with the network (i.e., not every cell change is reported to the network). The network does not know the actual location of the UE on cell-level, but only on TA-level. In idle state UE related contexts are deleted in the 3GPP radio access network (RAN) and it is possible to page the UE.

For the sake of completeness the state where the location of the UE in the 3GPP radio coverage is not known by the network at all (e.g., the UE is switched off) is the detached state.

In case a service requested by the terminal requires a specific QoS, which cannot be provided by the Default IP Access Service, additional bearer services are required. For this purpose, either the UE or the network requests additional resources. For example, in case of IMS services (see 3GPP TS 23.228, "IP Multimedia Subsystem (IMS), Stage 2", V. 7.2.0, available at http://www.3gpp.org, incorporated herein by reference), QoS requirements are signaled during application signaling, the Policy and Charging Rules Function (PCRF—see 3GPP TS 23.203, "Policy and charging control architecture", V.0.4.0, available at http://www.3gpp.org, incorporated herein by reference) authorizes the QoS and triggers the resource establishment. At the MME/UPE the UE's subscription is checked, admission control is performed and the resource establishment is initiated towards the RAN.

As mentioned above, the evolved system supports access to 3GPP services from non-3GPP radio access technologies as well. For this purpose either the Inter AS Anchor provides an IP interface and a UE can connect from a non-3GPP access system to the anchor directly via the IP interface, or another gateway provides the IP interface the UE is connected to, and the gateway is further connected to the Inter AS Anchor. Because of the IP connectivity between the UE and the gateway/anchor over a non-3GPP network, the connection is connectionless and unreliable. Thus, the Inter AS Anchor is not aware whether the UE is reachable or not.

For mobility between 3GPP and non-3GPP radio access technologies a UE with multimode capabilities is required. When the UE performs a handover from 3GPP to non-3GPP, the Inter AS anchor is informed about the location of the UE (e.g., in form of an IP address assigned to the terminal in the non-3GPP network or in form of another identifier of a tunnel endpoint the terminal is connected to). In addition to the location information the Inter AS anchor is provided with information about the user data packets (e.g., IP flows or packets marked with specific DiffServ Codepoint) to be transferred to the UE over the non-3GPP network.

The decision, which user data packets can be transferred over the non-3GPP network may e.g., depend on user subscription or operator policies. For example, for Voice over IMS (VoIMS) low delay is the main QoS requirement. The connection to a non-3GPP radio access technology may however provide high data throughput but with highly variable delay. Thus this connection should not be used for the VoIMS service. In case the operator employs different Inter AS Anchors for different services (e.g., one Inter AS Anchor for IMS services and another Inter AS Anchor for Internet services), one Inter AS Anchor might not provide the service for non-3GPP radio access technologies and thus not support mobility to non-3GPP (see Inter AS Anchor 1 in FIG. 2).

In one exemplary scenario a multimode UE has a non-3GPP and a 3GPP network interface and has an activate connection over the non-3GPP radio access technology. Furthermore, the UE wants to receive a service where either policies forbid to use the non-3GPP radio access technology or QoS requirements cannot be met in the non-3GPP radio access technology. Hence, the 3GPP network interface must be used for this service.

For being able to receive the 3GPP service over the 3GPP network, the UE must be either in active or in idle state. In the former case, the service activation and service delivery can start immediately. In the latter case, the UE is listening to paging messages and can set up a bearer after being paged. However in either states, the power consumption of the UE is significantly increased, because the 3GPP interface is active even when only the non-3GPP interface is used.

A work-around considered in an exemplary embodiment of the invention is to deactivate the 3GPP interface of the UE (i.e., the UE is detached) and to trigger the activation of the 3GPP interface over the non-3GPP network connection. Then, when the 3GPP interface is activated, resources can be set up and the application can be used. But with this solution the problem arises that the service activation is delayed until the connection with the selected 3GPP access network is completely established.

Hence, another potential problem is support of fast establishment for incoming connections over the 3GPP radio access and to enable low power consumption for multimode UEs at the same.

SUMMARY OF THE INVENTION

The object of the invention is to provide an improved method for initiating services to mobile terminals and/or to reduce power consumption of mobile terminals.

The object is solved by the subject matter of the independent claims. Advantageous embodiments of the invention are subject matters to the dependent claims.

One main aspect of the invention is the introduction of a new state called sleep state to reduce the power consumption. In one exemplary embodiment of the invention, the interface of a mobile terminal to a first access network is powered off (similar to detached state) to reduce power consumption but some context information of the mobile terminal is still stored in the network (similar to idle) to speed up service activation at later time.

One embodiment of the invention related to a method for initiating a service to a mobile terminal capable of communicating via at least a first and second access network. The mobile terminal has IP connectivity to the first access network and is in a sleep state in the second access network. For example, at least one of these two access networks may be a radio access network, such as a 3GPP-based (e.g., E-UTRAN, HSPA, UTRAN, etc.) or non-3GPP-based (e.g., WLAN, CDMA 2000, WiMAX, etc.) radio access.

The mobile terminal receives or transmits a service request through the first access network, and starts initiation of the service by control signaling through the first access network. The mobile terminal may further receive a command to activate the mobile terminal's interface to the second access network for service provision via the first access network, and may activate its interface to the second access network for continuing the initiation of the service or for receiving service data through the second access network. In an exemplary embodiment of the invention, activating the mobile terminal's interface to the second access network is similar to transiting into an active state for the second access network by the mobile terminal.

In a further embodiment of the invention, the method suggest to further set up a radio connection for service provision between the mobile terminal and the second access network upon activation of the mobile terminal's interface to the second access network. Thereupon, a routing entity in a core network may be informed on setup of the radio connection.

In another embodiment of the invention the mobile terminal has been assigned a first IP address for communication through the first access network and a second IP address for communication through the second network prior to receiving the service request. The mobile terminal may use the first IP address as a care-of address for receiving data addressed to the second IP address.

In sleep state, the mobile terminal's interface to the second access network is deactivated. Alternatively, the mobile terminal periodically receives broadcast system information from the second access network and/or does not transmit any uplink data to the second access network while in sleep state.

In a further embodiment of the invention, the command to activate the mobile terminal's radio interface comprises radio access network parameters for use by the mobile terminal.

Moreover, the invention provides another embodiment related to method for initiating a service for a mobile terminal through a first access network. In this embodiment, the mobile terminal has IP connectivity to a second access network and is in a sleep state in the first access network. A network entity in a core network, which could, for example, be an IP mobility management entity, transmits a service initiation request through the second access network to the mobile terminal. Alternatively, the service request may be received from the mobile terminal at the network entity.

Thereupon, initiation of the service by control signaling with the mobile terminal through the second access network is started. Further, system resources for providing the requested service are established in the first access network, and the network entity may transmit a command to the mobile terminal to activate its interface to the first access network, wherein the command is transmitted through the second access network.

In another embodiment of the invention, the network entity may receive a message indicating that the mobile terminal has established a radio connection to the first access network upon having transmitted the activation command, and routes service-related data destined to the mobile terminal through the first access network upon having received the message.

The advantage of the operation described above is that service initiation may be already started (and possibly even service provision) through the second access network, while resources in the first access network are being configured and the mobile terminal reactivates its interface to the first access network. As soon as the resources for service provision (and for finishing service initiation) are established in the first access network, the distribution path for service related data may be switched from the second to the first access network.

In order to provide data to the mobile terminal prior to activating its interface to the first access network, another embodiment of the invention foresees that a care-of address is registered previous to service initiation by the mobile terminal at an IP mobility management entity in the core network. This care-of address is used for packet transmissions to the mobile terminal through the second access network.

In a further embodiment of the invention a network entity of the core network may further determine whether to utilize the first or the second access network to provide the requested service to the mobile terminal, and the transmission of the command to activate the interface to the first access network and the configuration of system resources are performed, if it is decided to utilize the first access network.

Another embodiment of the invention foresees that the command to activate the mobile terminal's radio interface is transmitted by a network entity of the core network and comprises radio access network parameters for use by the mobile terminal. The radio access network parameters may speed up the setup of a connection to the first access network upon activating the interface by the mobile terminal.

In a variation of this embodiment, the radio access network parameters have been received by the network entity during configuration of system resources in the first access network from a mobility management and/or user plane entity to be serving the mobile terminal in the first access network.

A further embodiment of the invention foresees that a mobility management and/or user plane entity to be serving the mobile terminal in service provision through the first access network is determined. Moreover, in another embodiment of the invention also radio access parameters of the mobile terminal for service provision through the first access network may be determined. The radio access service parameters may, for example, include the service radio cell to be serving the mobile terminal in service provision.

In another advantageous embodiment of the invention the configuration of system resources comprises transmitting context information to a mobility management and/or user plane entity in the core network serving the mobile terminal in service provision through the first access network. For example, this context information may have been buffered in a network entity of the core network having mobility management and/or user plane entity functionality upon the mobile terminal transiting into sleep state.

In an alternative embodiment of the invention, a command to reactivate a context is transmitted to the mobility management and/or user plane entity to be serving the mobile terminal.

According to another alternative embodiment of the invention, a mobility management and/or user plane entity that has been serving the mobile terminal upon transiting into sleep state is instructed to transfer a context to the mobility management and/or user plane entity to be serving the mobile terminal.

Another embodiment of the invention relates to a method for reducing the power consumption of a mobile terminal supporting connectivity to at least two access networks. For example, at least one of these two access networks may be a radio access network, such as a 3GPP-based (e.g., E-UTRAN, HSPA, UTRAN, etc.) or non-3GPP-based (e.g., WLAN, CDMA 2000, WiMAX, etc.) radio access.

According to the embodiment the mobile terminal attaches to a first network. Thereby, the mobile terminal obtains an IP address for use in communication through the first access network. The IP address is then registered as a care-of address of the mobile terminal at an IP mobility management entity that is providing IP mobility management functionality to the mobile terminal.

Upon having registered the care-of address at the IP mobility management entity, the mobile terminal may transit into a sleep state for communication via a second access network.

In a further embodiment of the invention, the mobile terminal may attach to the second access network. In this attachment procedure, the mobile terminal may obtain an IP address for use in communication through the network. The IP address obtained when attaching to the first access network may be used as the care-of address, when transiting into sleep state.

In an exemplary embodiment the mobile terminal deactivates its air interface to the second access network in sleep state. Alternatively, in sleep state, the mobile terminal periodically receives broadcast system information from the second access network and/or does not transmit any uplink data to the second access network.

In another embodiment of the invention, a tracking area is assigned to the mobile terminal within the first radio access network. The tracking area may, for example, allow paging the mobile terminal through the first access network.

In a further embodiment of the invention, a network entity in the core network requests context information from a mobility management and/or user plane entity serving the mobile terminal in the second access network when transiting into sleep state.

In another embodiment of the invention, context information may be buffered/stored in the network entity for later use in service provision to the mobile terminal through the second access network.

An alternative to storing the context in the network entity may be the deactivation of a context at a mobility management and/or user plane entity in the core network serving the mobile terminal when transiting into sleep state.

Upon having registered the care-of address for the mobile terminal, it may be further advantageous to redirect data traffic directed to the mobile terminal to a gateway for provision to the mobile terminal through the first access network.

According to another embodiment the availability of the mobile terminal is checked through the first access network. For example, the mobility management entity may check the availability on an event triggered basis or periodically.

Further, in situations where connectivity to the first access network is lost or no data is transferred, it may be beneficial to reactivate the interface to the second access network. Therefore, another embodiment of the invention proposed that the mobile terminal activates its interface to the second access network in response to a timeout of a timer or if no data have been received via the interface to the first access network for a predetermined time span. Further, upon determining that connectivity to the first access network has been lost or no data is transferred, the interface may be (optionally) deactivated.

According to another embodiment of the invention, attaching to the first access network comprises transmitting a message from the mobile terminal to the IP mobility management entity to register the obtained IP address as the care-of address for an IP address of the mobile terminal to be used for communication through the second access network.

Moreover, one embodiment of the invention further foresee to obtain an IP address to be used by the mobile terminal for communication through the second access network when authenticating the mobile terminal in the first access network.

In another embodiment of the invention, the mobile terminal may be informed on an IP address to be used for communication through the second access network when attaching to the first access network.

Further, in another embodiment of the invention it is foreseen to generate a context at a mobility management and/or user plane entity within a core network connected to the first and second access network.

Alternatively, a mobility management and/or user plane entity within a core network connected to the first and second access network may be instructed by the IP mobility management entity to generate a context.

Further, when authenticating the mobile terminal in the first access network an identification of the IP mobility management entity may be obtained according to another embodiment of the invention.

In the embodiments described herein, the first and the second access network may use different access technologies.

Another embodiment of the invention is related to a mobile terminal capable of communicating via at least a first and second access network and having IP connectivity to the first access network and is in a sleep state in the second access network. The mobile terminal comprises a transceiver for receiving or transmitting a service request through the first access network, and for starting initiation of the service by control signaling through the first access network. The transceiver may be further operated to receive a command to activate the mobile terminal's interface to the second access network for service provision via the first access network. Further, the mobile terminal may comprise a controlling unit for activating the mobile terminal' interface to the second access network for continuing the initiation of the service or for receiving service data through the second access network.

Another embodiment of the invention relates to a network comprising at least one network element that can be operated to participate in the method according to one of the various embodiments described herein.

Another embodiment of the invention provides a further mobile terminal that is supporting connectivity to at least two access networks. The mobile terminal comprises a transceiver for attaching the mobile terminal to a first network, thereby obtaining an IP address for the mobile terminal for use in communication through the first access network, and for registering the IP address as a care-of address of the mobile terminal at an IP mobility management entity, wherein the IP mobility management entity provides IP mobility management functionality to the mobile terminal. Further the terminal includes a processor for transiting into a sleep state for communication via the second access network upon having registered the care-of address at the IP mobility management entity.

In another embodiment of the invention the mobile terminal is further operated to perform the steps of the method according to one of the various embodiments described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

One aspect of the invention is the introduction of a sleep state. A mobile terminal capable of communicating/accessing two access networks may be transited into sleep state for one of the access networks to reduce power consumption, while the terminal maintains connected via the other access network. Obviously, it is advantageous to enter into sleep state only if no services are currently running through the access network for which the mobile terminal wants to transit to sleep state or if running services may be redirected through the other access network.

Another aspect of the invention is to speed up service initiation for a service to be provided to the mobile terminal through the access network for which the mobile terminal is in sleep state. For this purpose, system resources are configured in the access network for which the mobile terminal is in sleep state while service initiation is already started through the other access network.

The principles outlined herein may also be advantageously used in heterogeneous networks, as, for example, outlined in the technical background section above.

To facilitate the establishment of system resources for the service an embodiment of the invention foresees that context information of the access network for which the mobile terminal is in sleep state may be maintained for the mobile terminal in the network even in sleep state. Upon service activation, the context information may be advantageously used to establish the system resources for the service. As soon as the resources are established (i.e., the mobile terminal enters active state for the access network through which the service is to be provided), the distribution path for service data and service related signaling may be switched to route the packets through the now activated access network to the mobile terminal.

The context information depends on the core network entity. For example, a context in a mobility management entity may, for example, comprise mobility states, authentication information, ciphering information, temporary IDs assigned to the mobile terminal for use in the access network for which the mobile terminal is in sleep state, QoS related information, etc. When establishing a context in the user plane entity, the context may, for example, comprise parameters of the IP bearer service or network internal routing information.

Figure 1:
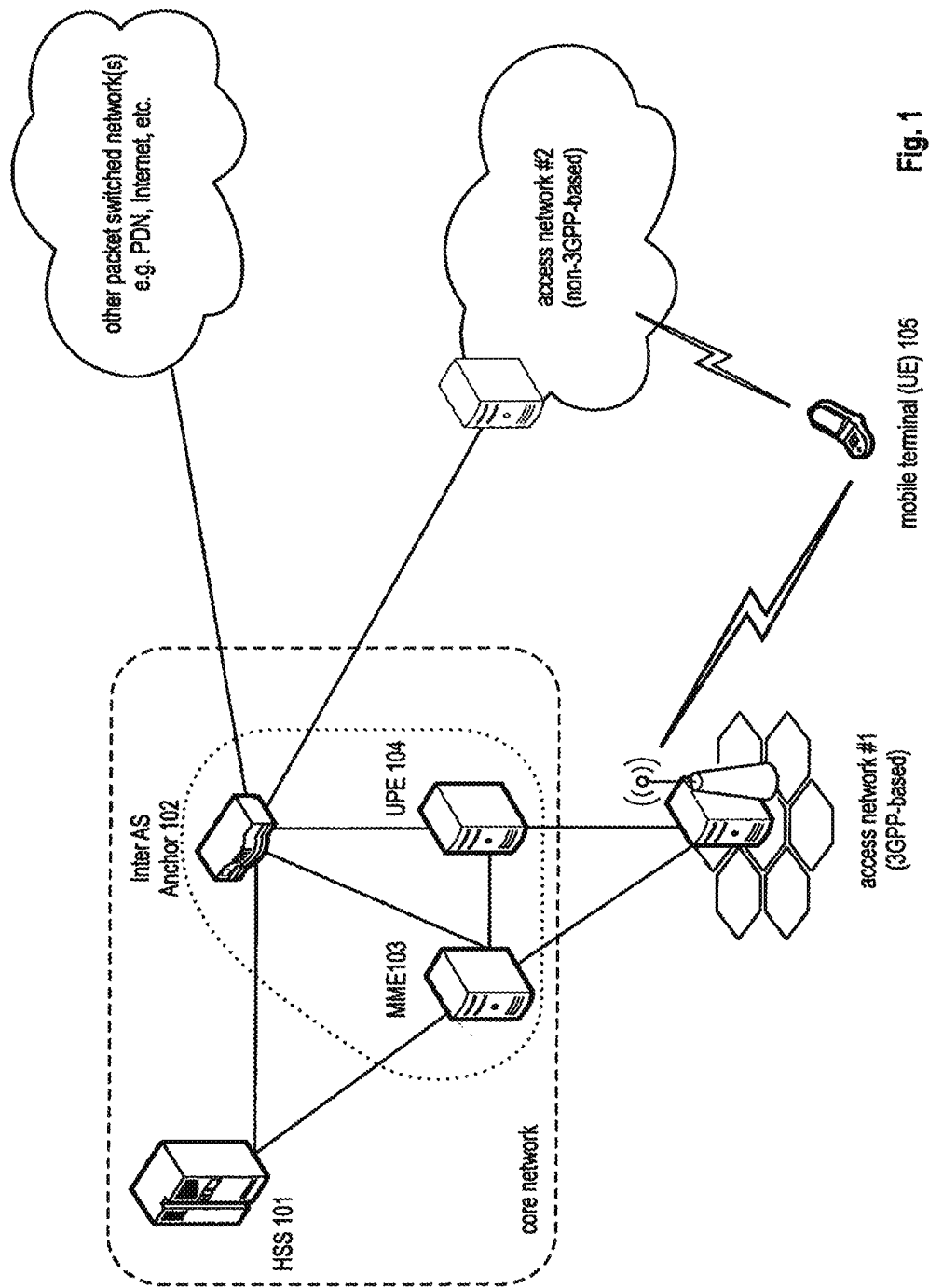
FIGS. 1 & 2 show examples of evolved 3GPP architectures.
Figure 2:
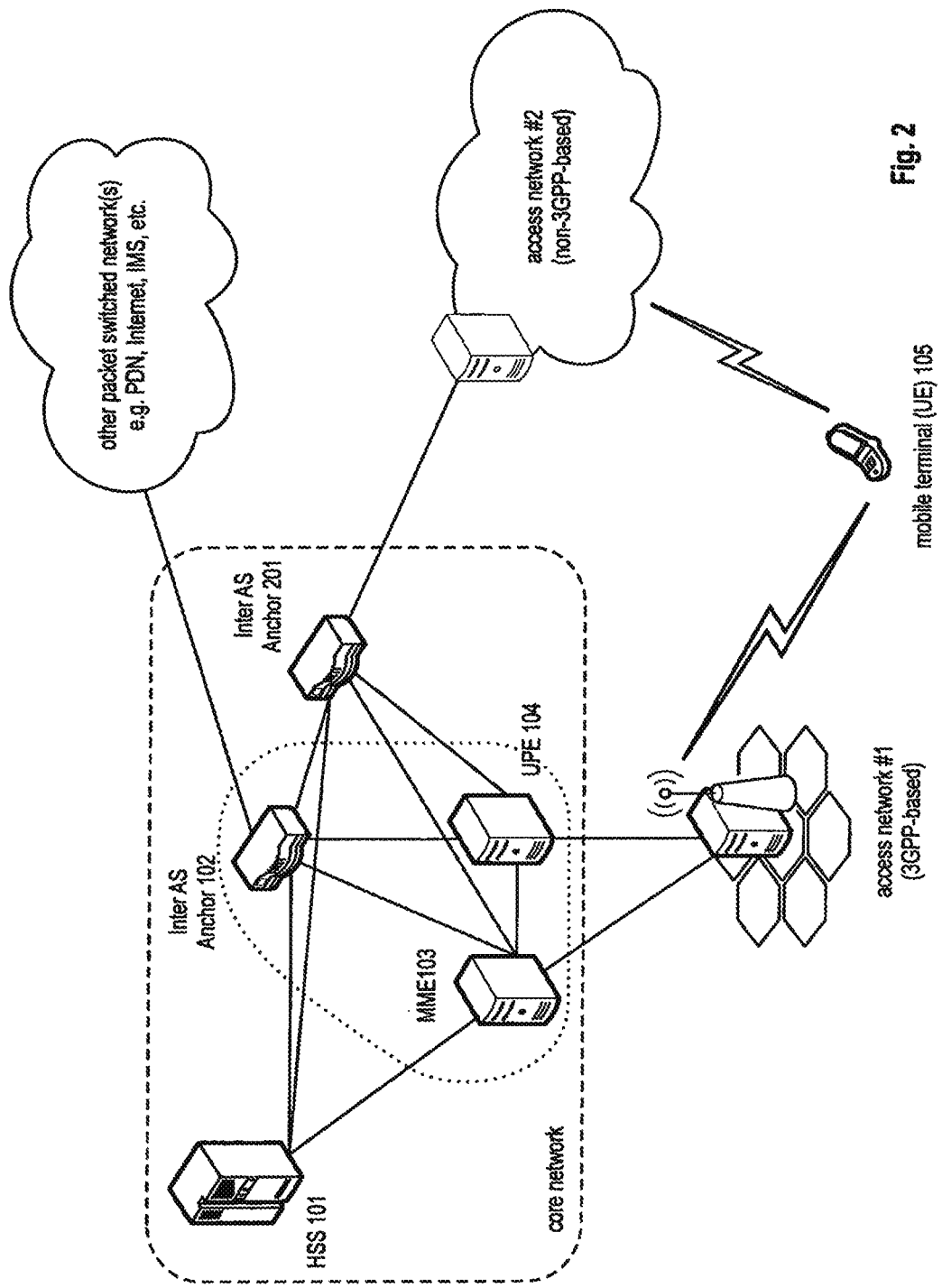
Figure 3:
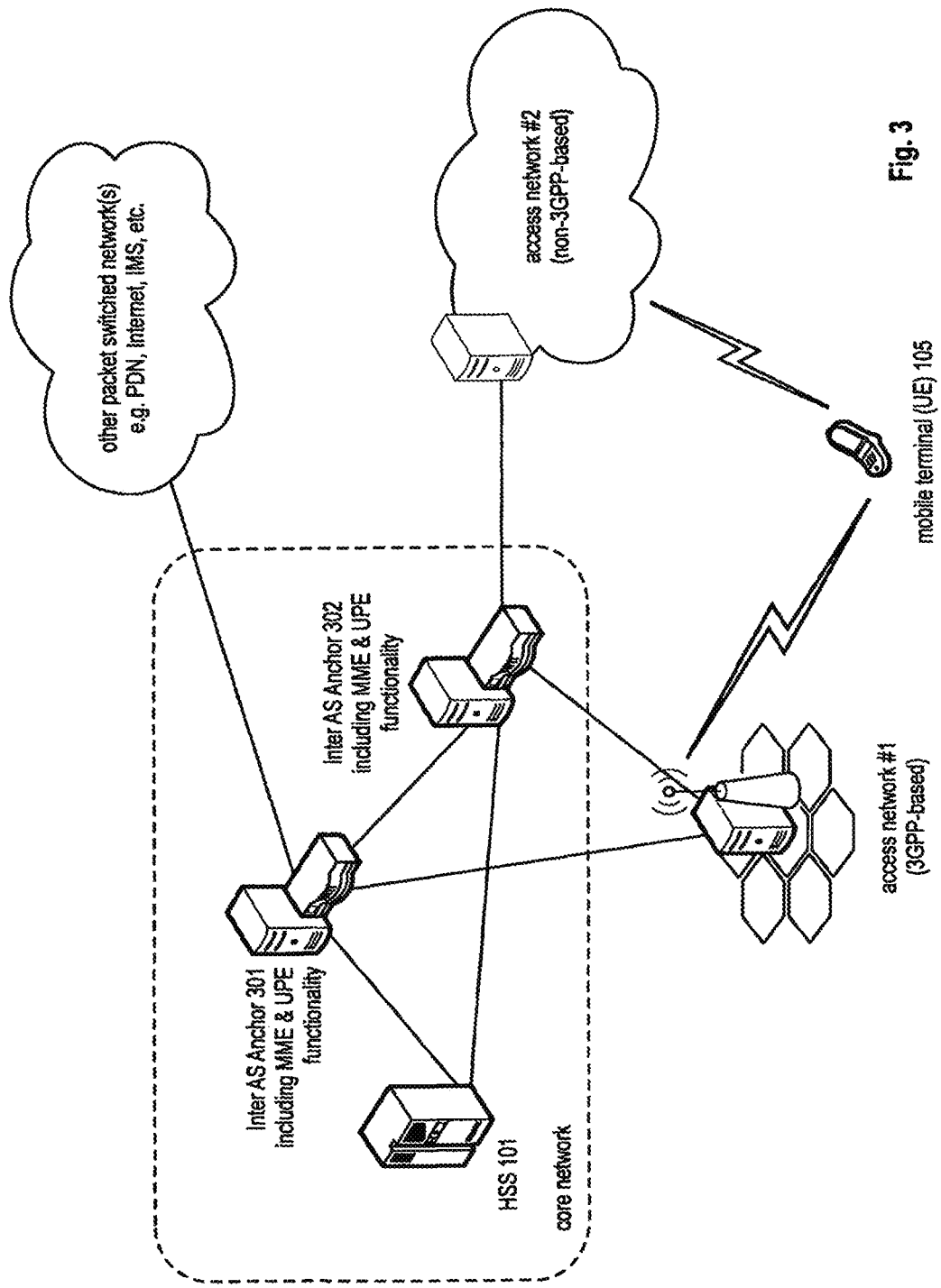
FIG. 3 shows another exemplary 3GPP architecture according to another embodiment of the invention where different functional entities are combined in Inter AS anchors.

The different embodiments of the invention may be implemented in a system architecture as shown in FIGS. 1 and 2. It should be noted that herein the term "entity" denotes a functional unit within the radio access network or core network. Hence, it is possible that several of these functional entities are combined in a single (physical) network element. In this respect, FIG. 3 shows another exemplary 3GPP architecture according to another embodiment of the invention where different functional entities are combined in Inter AS anchors.

Further, a mobility management entity (MME) denotes a functional entity managing mobility of terminal according to the protocols used in a respective access network (and core network—depending on the architecture) that is served by the mobility management entity. Similarly, an IP mobility management entity denotes an entity supporting IP mobility. Examples of IP mobility management entities are the functional entities specified in the Mobile IPv6 or Mobile IPv4 protocol that are commonly referred to as the "home agent" and "foreign agent".

It should be understood that in the context of this invention a mobile terminal is a terminal that may be connected to various networks as the user of the terminal moves. Hence, the term "mobile" is not intended to limit to the invention to its use in combination with technologies having a radio/air interface.

Figure 4:
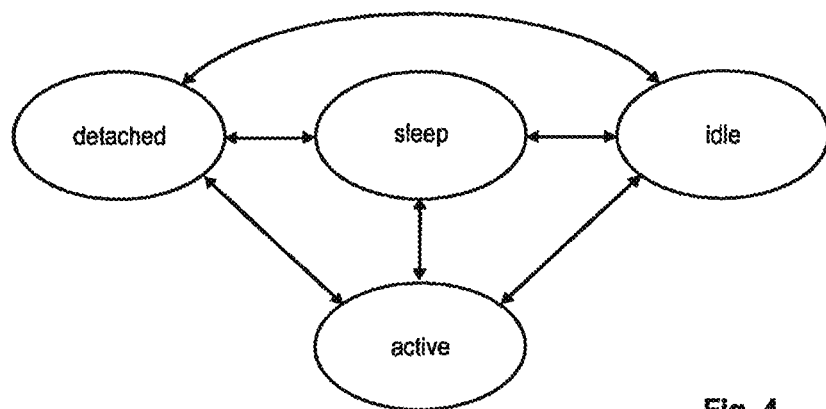
FIG. 4 shows the different states a mobile terminal may be in and the possible transitions from one state to the other according to an embodiment of the invention.

FIG. 4 shows the different states a mobile terminal may be in and the possible transitions from one state to the other according to an embodiment of the invention. The definitions of the active state, idle state and detached state are similar to those described in the technical background section. The sleep state suggested by the invention is a new state which enables reducing power consumption of the terminal while allowing fast service activation as will be explained herein.

In one embodiment the sleep state is defined as a state where the mobile terminal deactivates its interface to an access network. A mobile terminal being in sleep state in an access network means that the mobile terminal has deactivated its interface to this access network. If completely deactivating the interface, the mobile terminal receives and transmits no data through this interface, which is thus the potentially most efficient form of saving power in sleep state.

Another alternative definition of the sleep state is that the mobile terminal does not completely deactivate the interface to a particular access network but activates the interface, for example, periodically to receive system broadcast information from the network. However, no uplink data is transmitted by the mobile terminal through the access network for which it is in sleep state.

Figure 5:
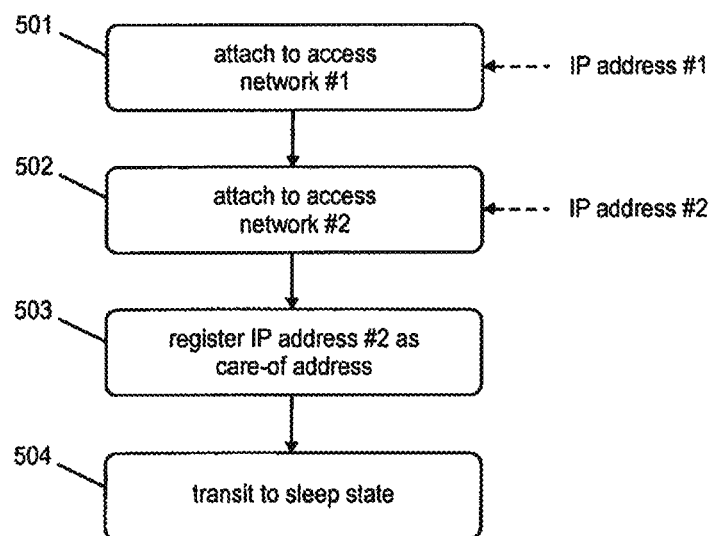
FIG. 5 shows an exemplary flowchart of a mobile terminal transiting into sleep state according to an exemplary embodiment of the invention.

FIG. 5 shows an exemplary flowchart of a mobile terminal transiting into sleep state according to an exemplary embodiment of the invention. First, the mobile terminal is attached 501, 502 to a first and a second access network, or attaches thereto. When attaching to the access networks, the mobile terminal selects or is assigned an IP address that it is using for communication through a respective one of the access networks.

For example, the first access network may be the home network of the mobile terminal (e.g., an 3GPP network). When using Mobile IP terminology, IP address #1 can also be referred to as the home address (HoA) of the mobile terminal in its home network according to this example.

The second access network could be, for example, wireless or wired non-3GPP access network, such as a WLAN access network or a (A)DSL network that the user of the terminal utilizes at home, at a hotspot, at an airport, hotel, etc. The second IP address #2 may be thus an IP address assigned to the mobile terminal for use in communication through the second access network. When using Mobile IP terminology again, the second access network may also be referred to as a visited network and the network may comprise a foreign agent to support IP-layer mobility.

Upon having decided or having been instructed to transit to a sleep state for the first access network, the mobile terminal registers 503 its IP address #2 of the second (visited) network as its care-of address at an IP mobility management entity located in a core network connected to the first and second access network. In a variation, this registration of a care-of address will also result in a rerouting of data directed to the mobile terminal's IP address #1 through the second access network.

Having received a confirmation for the registration of the care-of address, the mobile terminal may enter 504 into sleep state.

Further, in another embodiment the attachment to the first access network has also established context information within the individual network entities of the first access network. According to this embodiment, this context information may be preserved by buffering their content within the network so as to speed up service setup through the first access network when receiving a service request requiring data transport through the first access network, e.g., due to the service's QoS requirements.

In order to preserve the context information on the mobile terminal's IP connectivity in the first access network, the context may be transferred to a mobility management and/or user plane entity serving the mobile terminal. In this case the network entities having maintained the context information in the first access network (and core network) may delete the context information.

The removal of context information in the network entity/entities serving the mobile terminal in communication through the first access network may be advantageous, as malfunctioning of paging the mobile terminal can be avoided. Typically, in case a network entity (for example, a mobility management and/or user plane entity) maintains a context for a mobile terminal (for example, in idle state), it also assumes that the mobile terminal may be paged through its network (the first access network). However, in sleep state the mobile terminal may have deactivated its interface to the first access network, so that paging is no longer possible. To resolve this situation, the transfer of the context to another mobility management and/or user plane entity serving the mobile terminal may be beneficial.

An alternative solution could be an enhancement of the network entity/entities serving the mobile terminal in the first access network. In this case, the network entity/entities may maintain the context information but will reroute paging requests through the second access network as long as the mobile terminal is in sleep state for the first access network.

Figure 6:
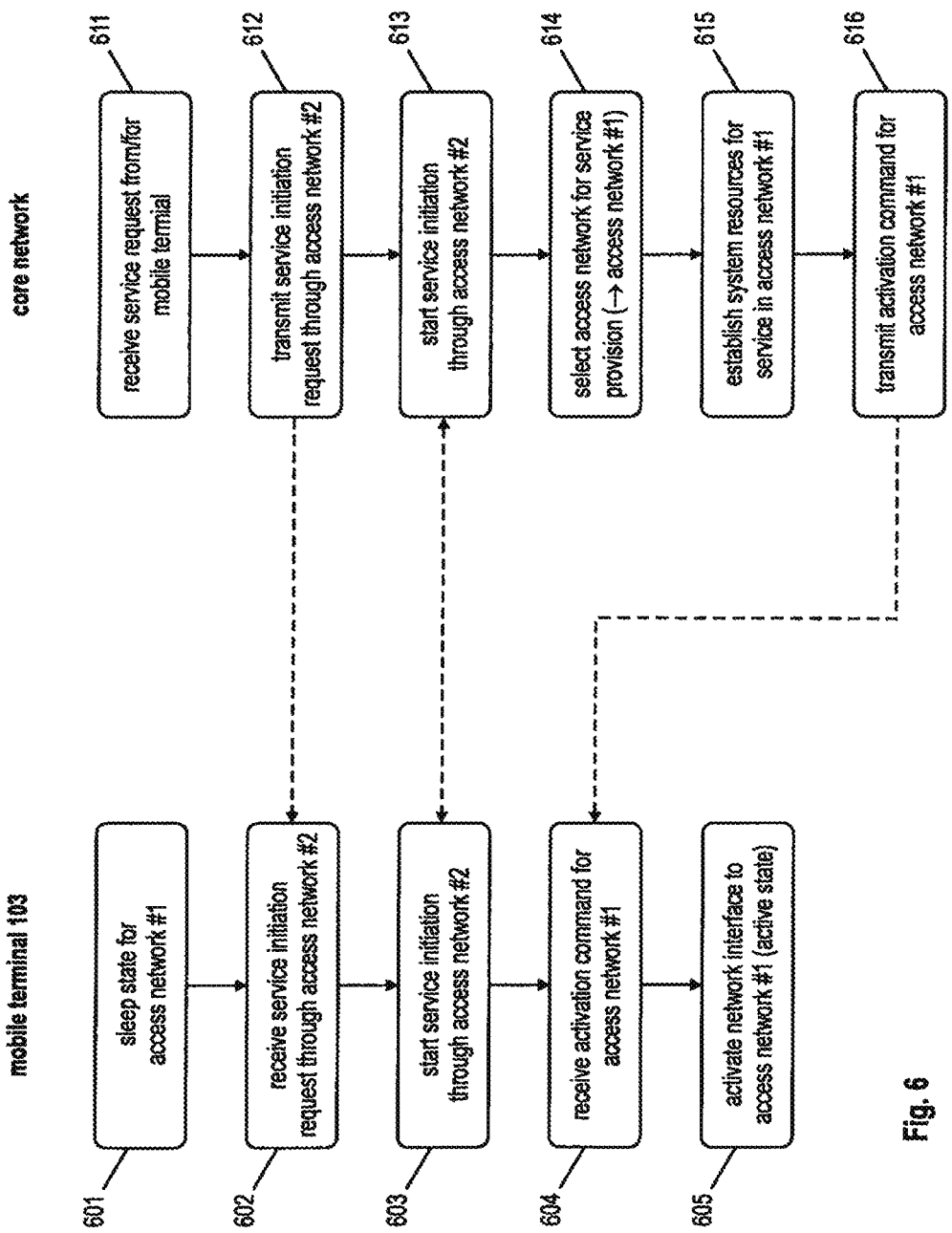
FIG. 6 shows an exemplary flowchart of the operations performed by the mobile terminal and the core network when initiating a service to the mobile in sleep state according to an embodiment of the invention.

FIG. 6 shows an exemplary flowchart of the operations performed by the mobile terminal and the core network when initiating a service to the mobile in sleep state according to an embodiment of the invention, In this example, it is assumed that the mobile terminal is 601 in sleep state for access network #1 while maintaining connectivity through access network #2. Generally, a service request may be received 611 at a responsible network entity in the core network from the mobile terminal or from another requesting user or entity. Steps 602 and 612 are thus only performed, if the mobile terminal is not initiating the service.

In this example, the network entity informs the mobile terminal on the requested service by sending 612 a service initiation request to the mobile terminal through the second access network (access network #2). The mobile terminal received 602 the service initiation request, and may start 603, 613 service initiation through access network #2. For example, the service may be initiated by SIP signaling as specified in IETF RFC 3261, "SIP: Session Initiation Protocol", incorporated herein by reference (available at http://www.ietf.org) or any other signaling protocol allowing to setup an application layer service.

Further, it may be decided 614 within the core network, whether the service constraints require the use of the first access network for service provision or not. For exemplary purposes it is assumed that due to QoS constraints associated to the service, the first access network (access network #1) is to be used for the service. Therefore, as a next step the resources for service provision are established 615 in the first access network (and also in the core network, if required).

When, for example, assuming an architecture as shown in FIG. 1 and that an IMS service is to be provided to the mobile terminal, the network configures all necessary resources along the distribution path (e.g., Inter AS anchor 102→UPE 104→(enhanced) NodeB) in the wired part of the network by establishing the appropriate contexts within the network.

Upon having finished resource reservation, the mobile terminal is instructed 616 to activate its interface to access network #1, i.e., to transit to active state. This command may, for example, also include RAN parameters that allow the mobile terminal to establish a connection to the access network #1 faster than using the access network-specific procedures for transiting into active state. For example, the RAN parameters may include at least one of a scrambling code, frequency information, power control information, depending on the type of the radio access.

Upon reception of the activation command 604 at the mobile terminal, same will activate 605 the interface to access network #1. This activation may, for example, include the establishment of the service bearer(s) required for communicating service related user plane and control plane data through access network #1.

In a variation of the embodiment outlined with respect to FIG. 6, it is assumed that mobile terminal related context information have been preserved in the network while the mobile terminal has been in sleep state as explained above. The setup of service resources in access network #1 may be speed up when communicating the buffered context information to the relevant network entities along the distribution path towards the mobile terminal through access network #1.

For example, assuming that Inter AS anchor 102 in FIG. 1 has MME/UPE functionality and has preserved the context information it may provide the context information to MME 103 and UPE 104 when establishing the system resources. Similarly, the MME 103 and/or UPE 104 may forward relevant context information to the downstream entities in access network #1.

As the mobile terminal may have moved and may no longer be served by the "old" MME/UPE, the Inter AS anchor 102 may determine which new MME/UPE is now serving the mobile terminal. Accordingly, the context information will be provided to the determined MME/UPE. If, for example, the "old" MME/UPE preserved the context, the Inter AS anchor 102 may instruct the "old" MME/UPE to forward the context information to the new MME/UPE. If the "old" MME/UPE is also now serving the mobile terminal, it may be instructed to reactivate the context, i.e., set the mobile terminal status back to active state.

Figure 7:
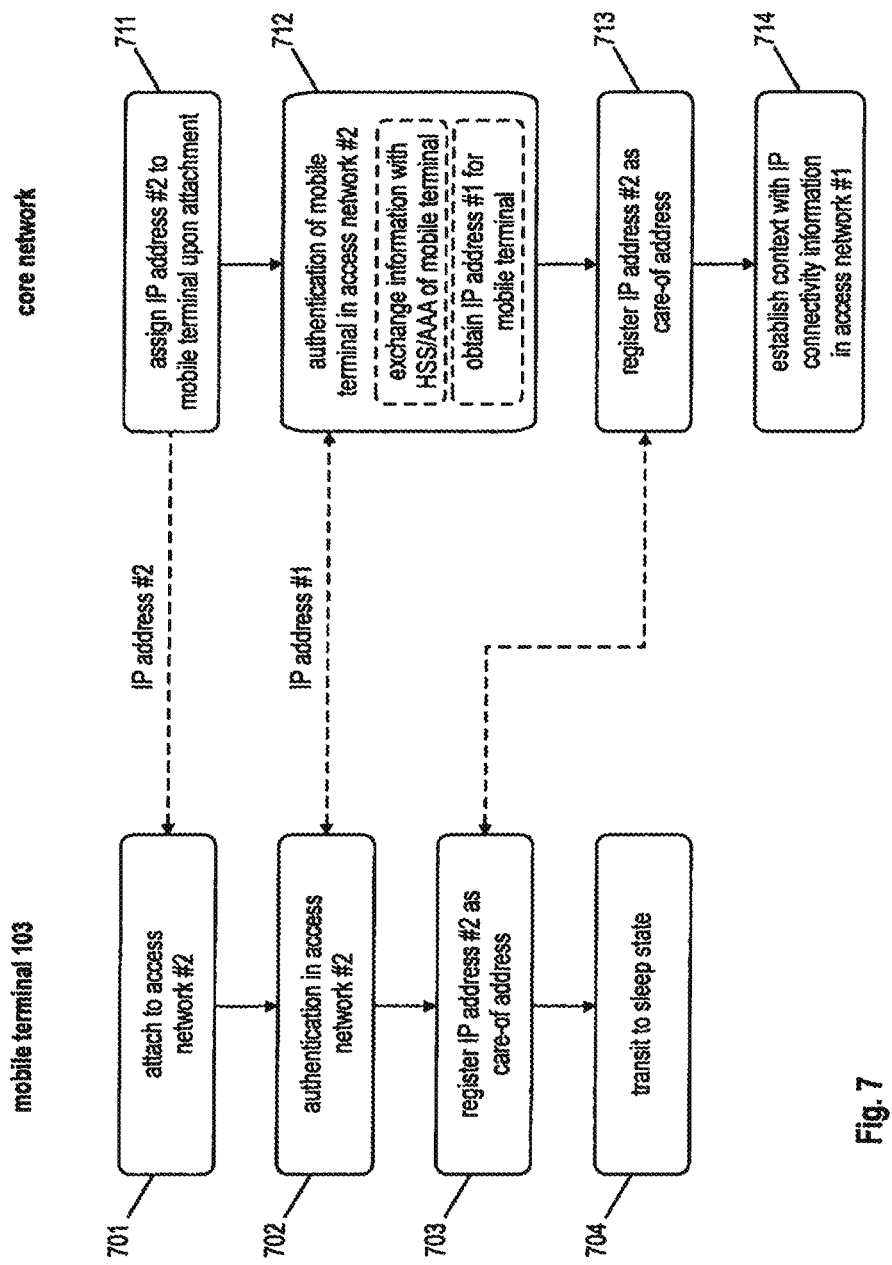
FIG. 7 shows other exemplary flowchart of the operations performed by the mobile terminal and the core network when transiting the mobile terminal into sleep state according to an embodiment of the invention.

Another alternative embodiment of the invention provides a solution where the initial attachment of the mobile terminal to access network #1 is not necessary. FIG. 7 shows other exemplary flowchart of the operations performed by the mobile terminal and the core network according to this embodiment of the invention when transiting the mobile terminal into sleep state. The terminal first attaches 701 to access network #2 and obtains an IP address #2 assigned 711 to it by the responsible network entity of access network #2 (or the core network). Upon having attached to access network #2, the mobile terminal performs authentication 702, 712 with the access network #2.

In an advantageous variation of this embodiment, the mobile terminal provides information to the participating network entity in access network #2 in the authentication signaling such that the network entity may identify the home network (access network #1/core network) of the mobile terminal. This could allow the network entity to identify the IP mobility management entity of the home network and optionally to obtain an IP address #1 (home address) for the mobile terminal on behalf of same.

Alternatively, the mobile terminal may directly identify the IP mobility management entity in the authentication signaling and/or may choose an IP address to utilize for communication with its home network.

In any case, the mobile terminal may proceed and register 703 the IP address for access network #2 as its care-of address at the IP mobility management entity in its home network. The registration of the care-of address may alternatively performed 713 by the network entity in access network #2 authenticating the mobile terminal. Upon registration of the care-of address, the mobile terminal may enter into sleep state for its home network (access network #1). It should be noted that the home agent of the mobile terminal does not have to be located in the core network attached to access network #1 and #2. If, for example, both access networks are visited networks, the request for registration of the care-of address is provided to the mobile terminal's home agent in its home network.

As no attachment to access network #1 (home network) has been performed, no context information for the mobile terminal for communication through access network #1 is available. To speed up the setup of a service to be provided through access network #1, the IP mobility management entity in the home network (core network) will generate or initiate the generation of context information for later resources reservation. Upon service initiation this context information may be provided to the network entity/network entities along the distribution path in access network #1, as has been explained with respect to FIG. 6 above.

In the following, details of the procedure for fast service activation of a multimode UE with reduced power consumption according to different embodiments of the invention are described. It should be noted that in these example, it is assumed that a first access network for which the mobile terminal may enter sleep state is a 3GPP enabled network, while the second access network is a non-3GPP enabled network. However, the principles outlined in the following would not be limited to being only applicable to this exemplary scenario.

Figure 11:
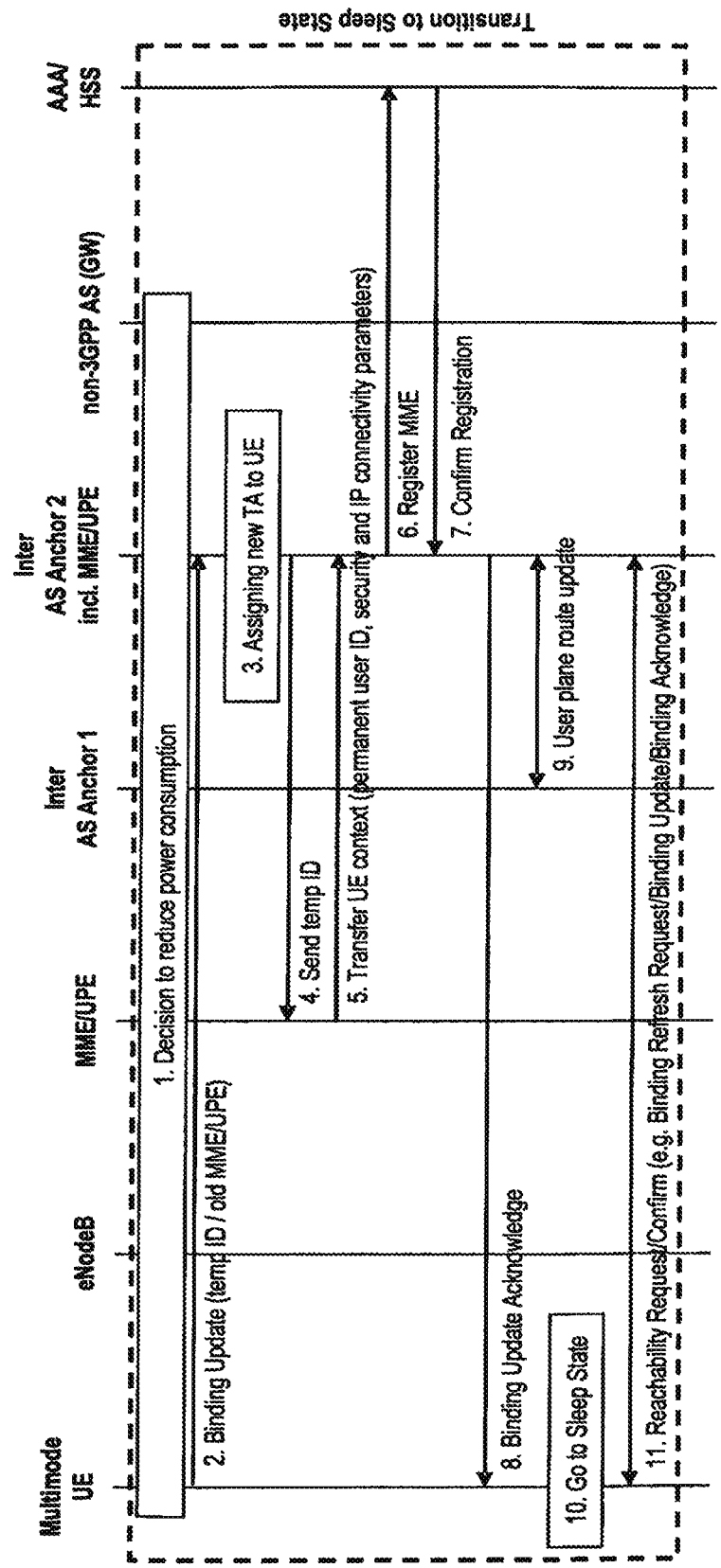
FIG. 11 shows an exemplary signaling procedure for transiting a mobile terminal from idle state to sleep state according to an exemplary embodiment of the invention.
Figure 12:
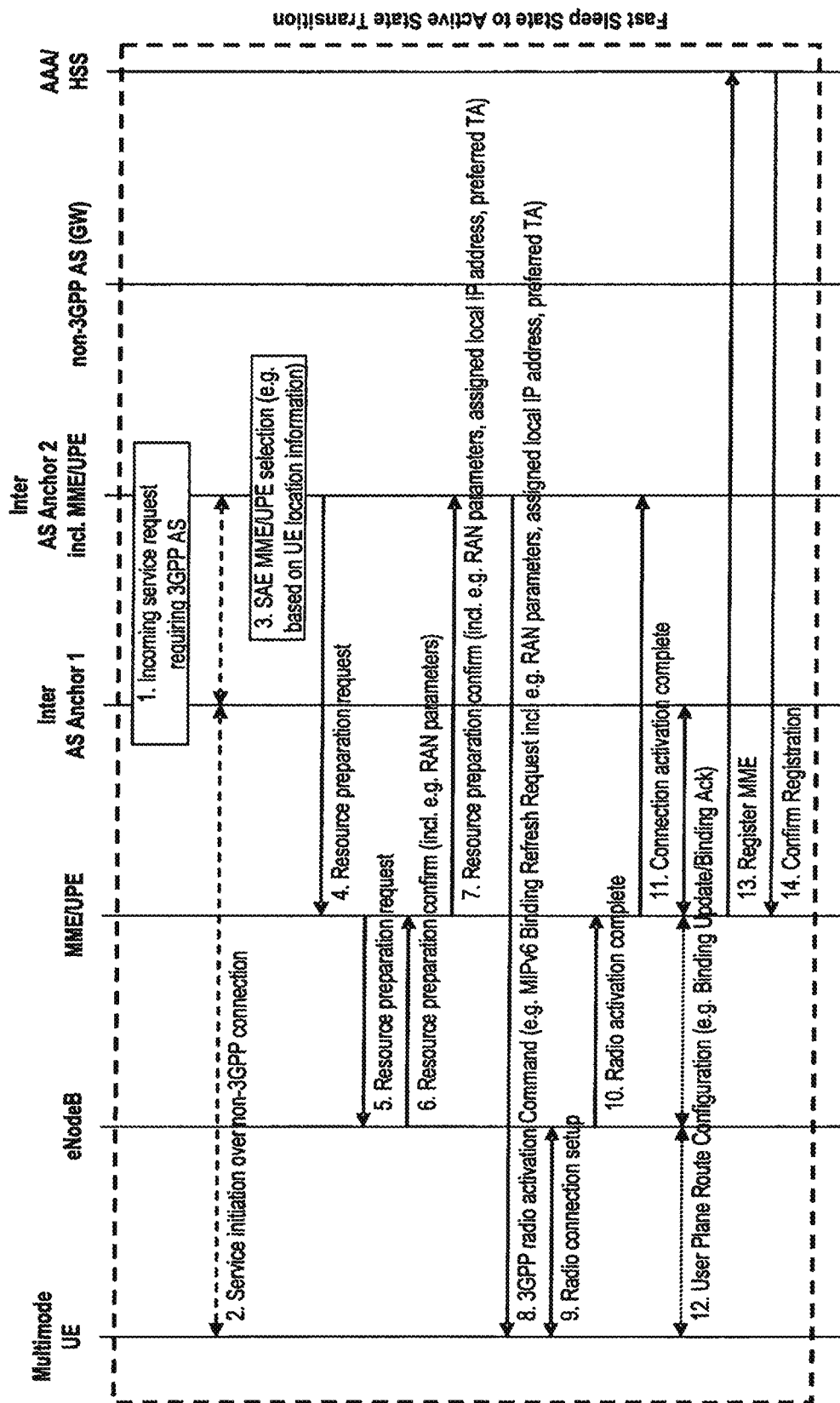
FIG. 12 shows an exemplary signaling procedure for initiating a service to a mobile terminal in sleep state according to an exemplary embodiment of the invention.
Figure 13:
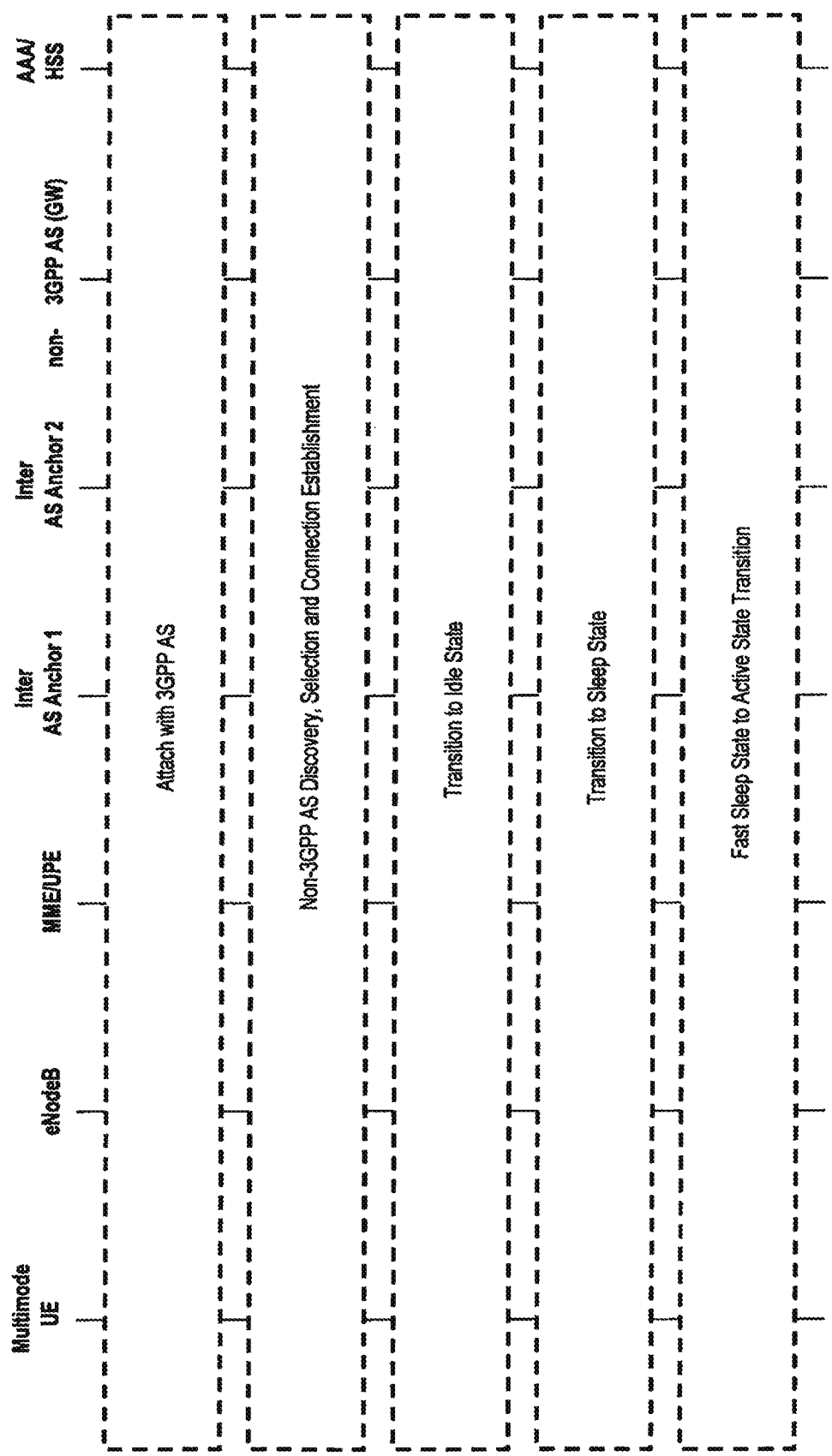
FIG. 13 shows an exemplary overview of the sequence signaling procedures as shown in FIG. 8 to 12.

FIG. 13 shows high level signaling of the procedure and gives an overview of the sequence signaling procedures as shown in FIG. 8 to 12. The mobile terminal is referred to as a User Equipment (UE). As the UE is capable of communicating with 3GPP enabled and non-3GPP enabled networks in this example, it is also referred to as a multimode UE.

According to an exemplary embodiment of the invention, the UE first attaches to the 3GPP Radio Access Network (RAN), and subsequently discovers and selects a non-3GPP RAN. Further, the UE establishes a connection to the non-3GPP RAN.

Next, the UE goes to idle state with the 3GPP radio interface. Subsequently, the UE's transiting into sleep state is initiated to further reduce power consumption. Then a new service request is incoming for the 3GPP interface, and in the following the fast transition from the sleep state to active state is performed.

The steps briefly explained above will be elaborated on in the following referring to the exemplary procedures shown in FIG. 8 to 12.

Figure 8:
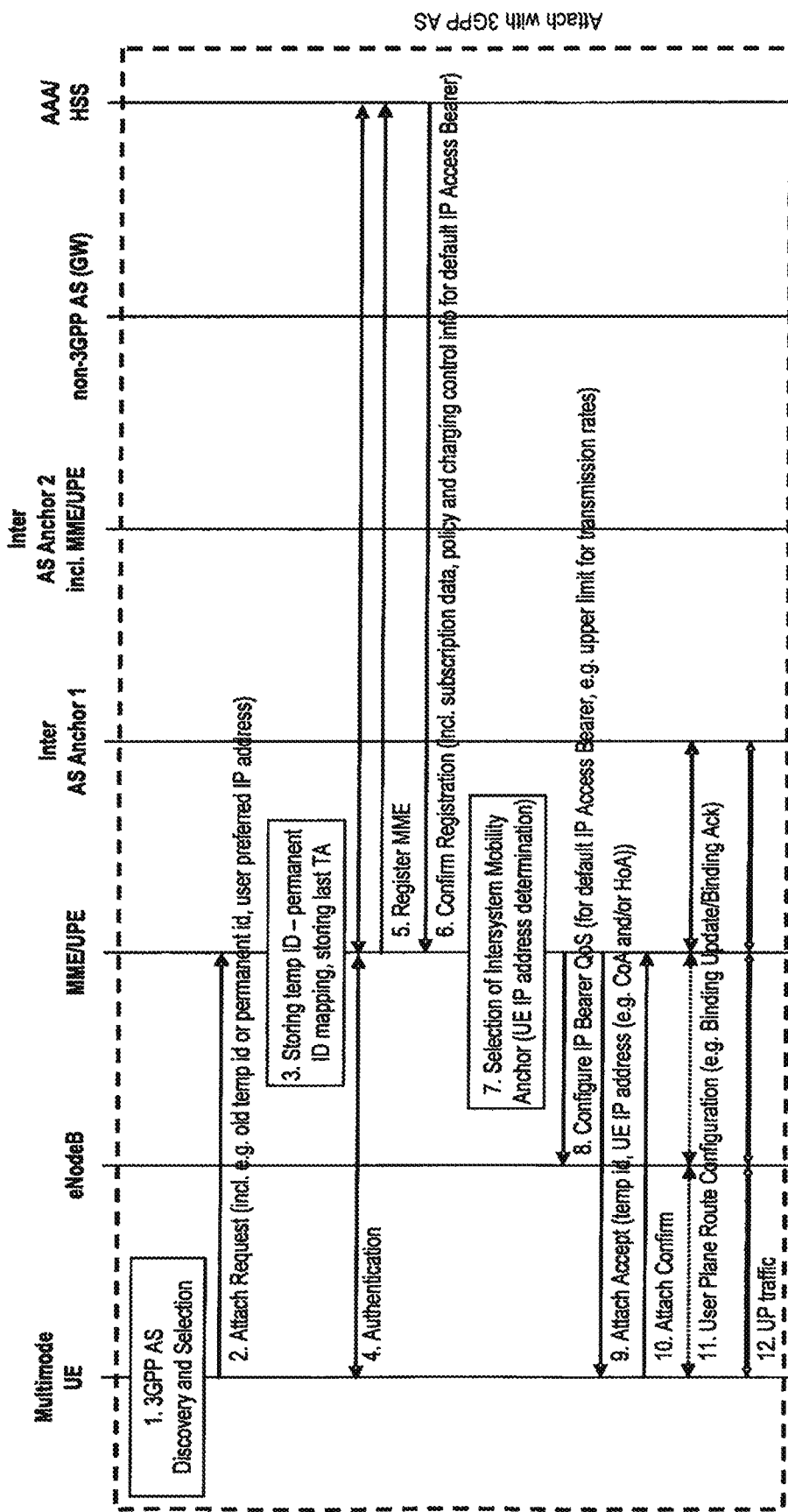
FIG. 8 shows an exemplary signaling procedure for attaching a mobile terminal to a 3GPP-based access network according to an exemplary embodiment of the invention.

FIG. 8 shows an exemplary signaling procedure for attaching a mobile terminal to a 3GPP-based access network according to an exemplary embodiment of the invention.

Upon the UE having discovered and selected the 3GPP Access System in step 1, for example, after power on, the UE attaches to the 3GPP network. This is done by sending an attach request to the 3GPP network in step 2, which may, for example, include an old temporary ID of the UE previously used in the network or alternatively an permanent ID of the UE, e.g., the IMSI. Further, the UE may suggest a preferred IP address for use in the request.

The MME/UPE receiving the request may subsequently (step 3) allocate temporary IDs to the UE. In addition, the last registered Tracking Area (TA) of the UE is stored in the MME/UPE (i.e., network element providing MME and/or UPE functionality). Subsequently the UE may be authenticated (step 4) in the network and the MME registers at the AAA/HSS server (step 5). Upon the UE and the Network (MME/UPE) are mutually authenticated and the MME/UPE having registered as serving the UE at the HSS/AAA, the HSS/AAA confirms the registration (step 6), and transfers subscription data, and policy and charging control information to the MME/UPE. This information may, for example, be maintained in a UE related context within MME/UPE.

Next, an Inter AS Anchor is selected (step 7). This may, for example, be done by the MME/UPE based on information transferred in an attach request from the UE. In this process the IP address to be used by the UE for IP-based communication through the 3GPP network is determined.

In step 8, the Default IP Access Bearer QoS may be configured and in step 9 the UE is informed on its IP address. Typically, assuming that the 3GPP network is the UE's home network, this IP address is the IP Home Address (HoA) of the UE. Otherwise the assigned IP address is a care-of address CoA that would have to be registered at the UE's home agent (HA) in the UE's home network.

Upon having received a confirmation of the UE's attachment (step 10) the User Plane route between eNodeB and MME/UPE and also the route (path) between MME/UPE and Inter AS Anchor is updated (step 11). This may, for example, be realized by Binding Update/Binding Acknowledgement messages. Then, user plane traffic can be transferred to the UE (step 12).

Figure 9:
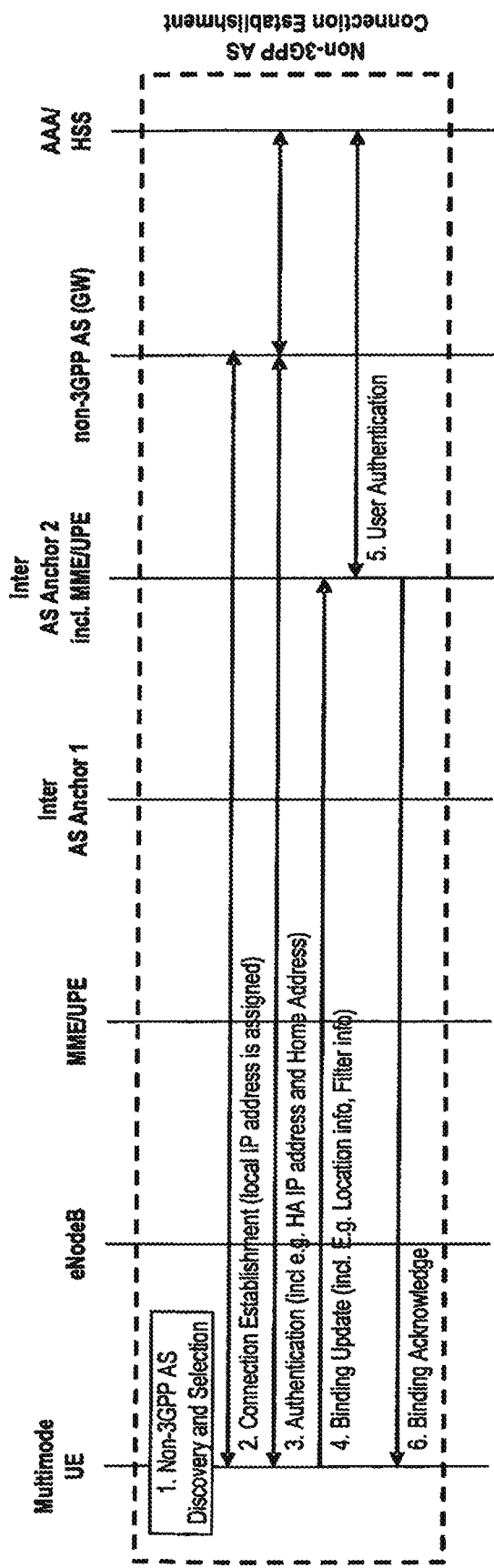
FIG. 9 shows an exemplary signaling procedure for attaching a mobile terminal to a non-3GPP-based access network according to an exemplary embodiment of the invention.

FIG. 9 shows an exemplary signaling procedure for attaching a mobile terminal to a non-3GPP-based access network according to an exemplary embodiment of the invention. Upon having attached to the 3GPP network, the UE may select (step 1) a non-3GPP Access System, for example, a WLAN Access Network.

Then, a local IP address is assigned to the UE, either by a gateway (e.g., the PDG—Packet Data Gateway) or by other means. If the gateway assigns the address, it may, for example, interrogate the user's Home AAA server to authenticate/authorize the user. In this communication, the gateway may receive the Inter AS Anchor IP address and the UE's HoA and may inform the UE about the Inter AS Anchor IP address and the UE's HoA.

After the UE is authenticated/authorized (step 3) at the gateway, the UE or the gateway sends (step 4) a Location Update (e.g., Binding Update of MIPv6—see IETF RFC 3775, "Mobility Support in IPv6", incorporated herein by reference, available at http://www.ietf.org) to the Inter AS Anchor. The Location Update may also comprise additional location information apart from an IP address. The Location Update may also comprise filter rules about the services or flows that should be transferred to the UE over the non-3GPP Access System. Alternatively, the filter rules may be requested from a PCRF or additional rules are transferred from the PCRF to the Inter AS Anchor.

Then, the Inter AS Anchor authenticates (step 5) the UE and replies with an Acknowledgement (MIPv6 Binding Update Acknowledge) (step 6).

Figure 10:
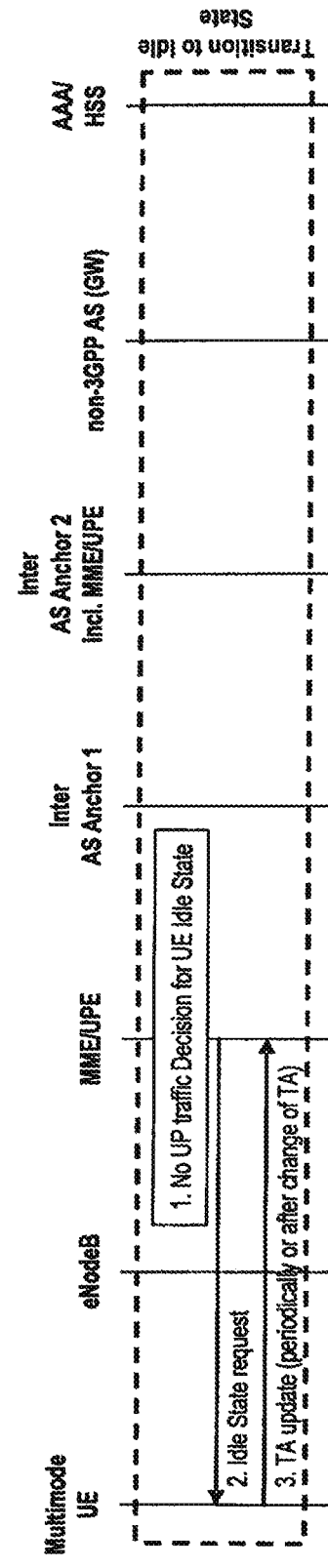
FIG. 10 shows an exemplary signaling procedure for transiting a mobile terminal from active state to idle state according to an exemplary embodiment of the invention.

FIG. 10 shows an exemplary signaling procedure for transiting a mobile terminal from active state to idle state according to an exemplary embodiment of the invention. In case the UE is not using the 3GPP Access System (step 1), i.e., no user data packets are transferred, the MME/UPE or the eNodeB may trigger (step 2) the UE to go to idle state. In this state the mapping between temporary and permanent user IDs and the last registered TA is stored in the MME/UPE. When the UE moves to another cell and changes the TA, it may perform TA registration procedure (step 3), i.e., a connection with the 3GPP Access System is established and the new TA is signaled to the MME/UPE.

FIG. 11 shows an exemplary signaling procedure for transiting a mobile terminal from idle state to sleep state according to an exemplary embodiment of the invention. For exemplary purposes, a network as shown in FIG. 2 is assumed to explain the operations of the UE and network when transiting the UE from idle state to sleep state.

Since the UE has an active non-3GPP connection established and the 3GPP Access System is not used (idle state), the UE or the network may decide (step 1) to further reduce the power consumption and the signaling load on the radio link and in the network. The decision can be made, for example, based on an expired timer that has been started upon the UE entering idle state.

For entering the sleep state, the UE sends (step 2) a message to the Inter AS Anchor 2 (e.g., a MIPv6 Binding Update, including a temp ID and the old MME/UPE) to trigger Inter AS Anchor 2 to register itself as new non-3GPP AS MME/UPE for the UE in sleep state. In this example, it is also assumed that Inter AS Anchor 2 (non-3GPP AS Anchor) provides MME and UPE functions (non-3GPP AS MME/UPE). It is also possible, that the non-3GPP Inter AS Anchor 2's MME/UPE functions are logically separated from the Inter AS Anchor in another network entity/other network entities.

In order to differentiate the 3GPP Access System registration from the non-3GPP Access System registration in the new non-3GPP AS MME/UPE, the Inter AS Anchor may allocate (step 3) a special TA for the non-3GPP Access System, which is e.g., stored in the non-3GPP AS MME/UPE.

According to one exemplary implementation, the non-3GPP AS Anchor's MME function may send (step 4) the temp ID of the UE to the old network entity with MME/UPE function that has been serving the UE so far. The old MME/UPE may respond by sending (step 5) the UE's context (including, e.g., the permanent user ID, security and IP connectivity parameters) to the new non-3GPP AS MME/UPE. The temporary ID of the UE provided in step 4 is thereby used to identify the UE and context.

In an alternative implementation, the non-3GPP AS MME/UPE may command the old 3GPP AS MME/UPE to preserve the context information for the UE. In this implementation, the 3GPP AS MME/UPE would indicate the sleep state in the UE context and may update the User Plane route to pass all data directed to the UE through non-3GPP AS Anchor 2. Further, the 3GPP AS MME/UPE may indicate in their UE context that the UE can no longer be contacted (e.g., paged) through the 3GPP network, so that all service requests need to be redirected through the non-3GPP network.

The Inter AS Anchor further triggers the non-3GPP AS MME/UPE to register itself as new MME/UPE for the UE in idle state. In step 6, the non-3GPP AS MME/UPE sends a registration message to the HSS which will confirm (step 7) the registration. Further, Inter AS Anchor 2 confirms (step 8) the registration with the UE (e.g., with a MIPv6 Binding Update Acknowledgment). Upon receiving the confirmation, the UE may enter into sleep state (step 10).

In case the UE was connected to multiple Inter AS Anchors and it is required that these anchors keep located on the user plane path, the path between these Inter AS Anchors and the Inter AS Anchor serving the non-3GPP connection is updated (step 9).

Because the connection over the non-3GPP Access System is unreliable, the Inter AS Anchor 2 may optionally check (step 11) the reachability of the UE, e.g., with periodically sending MIPv6 Binding Refresh Request messages, which must be answered by the UE with Binding Update. If the UE is not reachable over the non-3GPP interface anymore (e.g., because it has moved out of WLAN coverage—which could e.g., be detected by the UE not answering a given number of consecutive Binding Refresh Request messages), Inter AS Anchor 2 triggers the transition back to idle state in the 3GPP network. Also, if the UE does not receive reachability messages anymore for some time, it may reactivate its 3GPP interface and transits back to 3GPP idle state.

FIG. 12 shows an exemplary signaling procedure for initiating a service to a mobile terminal in sleep state according to an exemplary embodiment of the invention. In case a call/service (e.g., IMS or MBMS—see, for example, 3GPP TS 23.246, "Multimedia Broadcast/Multicast Service (MBMS); Architecture and functional description", V. 6.9.0, incorporated herein by reference, available at http://www.3gpp.org) only receivable over the 3GPP Access System is incoming or is initiated by the UE in sleep state (step 1), Inter AS Anchor 2 may detect this based on pre-established filter rules (e.g., SIP request is detected—see IETF RFC 3261) and starts the transition to 3GPP active state for the UE. Only receivable via the 3GPP Access System may, for example, mean that the non-3GPP AS is not capable of providing the service at all, not at requested/required QoS parameters associated to the service, UE policy and billing rules or AAA constraints require the provision through the 3GPP network.

In case of an incoming call/service, the Inter AS Anchor 2 forwards or tunnels the call/service signaling for initiating the call/service to the UE through the non-3GPP Access System (step 2). Regardless of whether it is an incoming or UE-initiated call/service, the UE begins with the service establishment using the non-3GPP Access System connection.

At the same time the non-3GPP AS MME/UPE functionality of Inter AS Anchor 2 may select (step 3) new network entities with MME/UPE functionality (new MME/UPE) to be serving the RAN nodes the UE is going to use. This could, for example, be accomplished by mapping available non-3GPP AS location information (e.g., derived from the topologically correct IP address assigned to UE's non-3GPP network interface) to the correspondent TA and RAN nodes in the 3GPP AS. In this latter case, the non-3GPP AS may be a stationary access system (e.g., ADSL connection).

Alternatively, if the 3GPP cell coverage is larger than the coverage of the non-3GPP AS (WLAN hotspot), the NodeB serving the UE may probably be the same than before switching to the non-3GPP AS. If no location information mapping is possible, the non-3GPP AS MME/UPE may select a default MME/UPE serving all RAN nodes in the network for the purpose of fast 3GPP activation of multimode UEs in sleep state. In this case, after the 3GPP radio connection is established, the default MME/UPE can handover the UE to a better MME/UPE (i.e., closer to the UE).

Furthermore, the non-3GPP AS MME/UPE triggers (step 4) the new MME/UPE to setup resources for the call/service. The new MME/UPE sends (step 5) a resource preparation request to the relevant nodes, e.g., the NodeB, in case information about the corresponding RAN nodes is available. Alternatively the non-3GPP AS MME/UPE or Inter AS Anchor 2 triggers the other involved Inter AS Anchors to setup resources.

The eNodeB and the MME/UPE confirm (steps 6 and 7) the resource preparation to the non-3GPP AS MME/UPE (including, e.g., IP address assigned by MME/UPE, preferred TA and other parameters). In response to the confirmation, Inter AS Anchor 2 sends (step 8) a 3GPP radio activation command message to the UE to instruct the UE to transit from sleep state to active state. E.g., this activation command may be included in a MIPv6 Binding Refresh Request with the IP address assigned by the new MME/

UPE, preferred TA, serving cell and other parameters) that is transmitted to the UE via the non-3GPP access network. In response to the command, the UE activates the 3GPP radio interface and establishes synchronization with the 3GPP Radio Access Network and the 3GPP connection for service delivery (step 9). The RAN node (e.g., eNodeB) may send (step 10) an activation complete message to the new MME/UPE and the new MME/UPE indicates (step 11) the completion of the 3GPP radio connection setup to the non-3GPP AS MME/UPE.

Next, the user plane between UE, new UPE and Inter AS Anchor 1 (or Inter AS Anchors, when multiple are involved) is updated (step 12). This may typically include the update to the user plane route (compare step 9 in FIG. 11, where the user plane has been redirected through the non-3GPP access network). Finally, the new MME may update (step 13) the location with the HSS/AAA that confirms (step 14) the registration. Optionally, the HSS/AAA may inform the non-3GPP MME/UPE that the UE context may be deleted.

The contents of the messages exchanged during resource setup in steps 4 to 7 may depend on the strategy used to preserve the UE context in 3GPP sleep state. If the context has been transferred to the non-3GPP MME/UPE as suggested in FIG. 11, the resource preparation request in step 4 may include the context information to aid the new MME setting up the resources.

If preserving the UE context in the MME/UPE that has been serving the UE before transiting to sleep state (old MME/UPE), operation will depend on whether this old MME/UPE is still serving the UE when receiving the call/service. If so, the old and new MME/UPE may simply reactivate the context upon receiving the resource preparation request. Further, it may also update the user plane route.

If the new MME/UPE does not correspond to the old MME/UPE; the non-3GPP MME/UPE may instruct the old MME/UPE to initiate resource establishment for the service. The old MME/UPE may then instruct the new MME/UPE to setup the resources and may include the preserved context information to the request.

Another optional implementation detail is a trigger for transiting from sleep state to idle state by the UE. When the UE is inactive over the non-3GPP Access System connection for some time (e.g., detected by time-out), the network or the UE may decide to transit back to idle state in the 3GPP AS, i.e., the UE will (re)activate its air interface to the 3GPP AS. The UE may also deactivate the non-3GPP radio interface to save power. The UE may perform a TA update, which results in the UE context information being transferred from the non-3GPP AS MME/UPE to the new MME/UPE serving the UE in the 3GPP AS.

The advantage of moving back to idle mode is that the power consumption of an inactive, but activated non-3GPP Access System connection can be noticeable higher than the power consumption of a 3GPP interface in idle state.

In some previous embodiments of the invention, it has been assumed that non-3GPP AS MME/UPE and Inter AS Anchor are separated so that signaling between the entities has been required. In another embodiment of the invention, instead of using a separate non-3GPP AS MME/UPE, also the old MME/UPE can be used to store the sleep state as indicated above. In case of an incoming call/service, the old MME/UPE detects based on the sleep state that non-3GPP Access System connection is active and thus forwards the packets to the Inter AS Anchor serving the non-3GPP Access System connection.

Further, it has also been assumed in some embodiments of the invention that the 3GPP radio interface of the multimode UE in sleep state is switched off. In another embodiment of the invention the UE does not switch off the 3GPP radio interface completely. According to this embodiment the UE may listen periodically to broadcast system information and only stops sending messages over the 3GPP radio interface, e.g., no location updates are sent over the 3GPP radio interface when moving. Instead, location changes of the 3GPP radio interface (e.g., TA changes or even cell changes) are signaled over the active non-3GPP Access System connection. This reduces the power consumption of the multimode UE, because no 3GPP radio connection must be established specifically for location updates and also the amount of signaling in the 3GPP network is reduced. This procedure has the additional advantage that it is possible to have fast service activation and reduced power consumption even when the topological location of the non-3GPP network interface cannot be used to derive the topological location of the 3GPP network interface.

In some embodiments of the invention it has been assumed that the multimode UE attaches to the 3GPP Access Network using a 3GPP radio connection. In another embodiment of the invention the UE is attaching to the 3GPP Access Network using the non-3GPP Access Network connection. First the UE attaches to the non-3GPP Access Network, it is provided with a local IP address and additionally—e.g., during authentication the UE—with a home IP address. After registration of the local IP address as the care-of address, the UE or the network may trigger the Inter AS Anchor to establish context information for the UE in the non-3GPP AS MME/UPE and to set the mobility state to sleep. Furthermore, the UE may connect to other anchors providing connectivity to other services using the non-3GPP Access Network connection and the non-3GPP AS MME/UPE as MME/UPE. Then, the UE can receive services via the 3GPP Access Network and transit from sleep to active.

In previous embodiments of the invention it has been assumed that the Inter AS Anchor of the multimode UE providing non-3GPP AS MME/UPE functionality is in the home network of the UE and is connected to both, the 3GPP Access Network and to the non-3GPP Access Network. In another embodiment of the invention the Inter AS Anchor is in a visited network. The visited network has a connection to one Access Network (e.g., the non-3GPP Access Network) and another network (e.g., the home network) has a connection to the other Access Network (e.g., the 3GPP Access Network).

Another embodiment of the invention relates to the implementation of the above described various embodiments using hardware and software. It is recognized that the various embodiments of the invention may be implemented or performed using computing devices (processors). Computing devices or processors may, for example, be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc.

The invention claimed is:

1. An integrated circuit which, in operation, controls a process of a communication apparatus in a second access network capable of communicating with a mobile terminal capable of communicating with a core network via a first access network or the second access network, wherein radio access technology of the first access network is different from radio access technology of the second access network, and the controlled process comprises:
  forwarding, by the communication apparatus, a paging request to the mobile terminal, wherein the paging request addressed to the mobile terminal is to be routed through the first access network but is rerouted through the second access network when the mobile terminal is attached to the second access network;
  receiving, by the communication apparatus, a message from the mobile terminal through the second access network in response to the paging request, the message requesting a service to be delivered through the first access network; and
  transmitting, by the communication apparatus, a handover command through the second access network to the mobile terminal, the handover command directing the mobile terminal to perform handover to the first access network and to connect to the first access network.

2. The integrated circuit according to claim 1, wherein the controlled process comprises: notifying, by the communication apparatus, an entity in the core network that the mobile terminal is configured to use the second access network for receiving data when the mobile terminal is attached to the second access network.

3. The integrated circuit according to claim 2, wherein the entity comprises a mobility management entity.

4. The integrated circuit according to claim 1, wherein the service comprises a voice service.

5. The integrated circuit according to claim 1, wherein the mobile terminal is in a deactivated state in the first access network when the mobile terminal is attached to the second access network.

6. The integrated circuit according to claim 1, wherein a distribution path for the service is switched to the first access network after the mobile terminal enters an active state in the first access network.

7. The integrated circuit according to claim 1, wherein the message received through the second access network requests initiation of the service.

8. The integrated circuit according to claim 1, wherein the handover command is for instructing the mobile terminal to be activated in the first access network.

9. The integrated circuit according to claim 8, wherein the activation in the first access network includes establishment of a bearer service through the first access network.

10. The integrated circuit according to claim 1, wherein the communication apparatus is a base station.

* * * * *